United States Patent [19]

Wenzel et al.

[11] 4,386,692
[45] Jun. 7, 1983

[54] APPARATUS FOR AUTOMATICALLY LOADING AND ORIENTING A CYLINDRICAL WORKPIECE

[75] Inventors: Heinz-Dieter Wenzel, Weidenweg, Fed. Rep. of Germany; Melville Hanson, deceased, late of Nurtingen, Fed. Rep. of Germany

[73] Assignee: The Cross Company, Fraser, Mich.

[21] Appl. No.: 277,621

[22] Filed: Jun. 26, 1981

[51] Int. Cl.³ .............................................. B65G 47/24
[52] U.S. Cl. ...................................... 198/394; 221/173
[58] Field of Search .............. 198/394, 383, 388, 391; 221/171, 173

[56] References Cited

U.S. PATENT DOCUMENTS 3,103,283 9/1963 Preuss ................................. 198/391

FOREIGN PATENT DOCUMENTS 7414200 5/1975 Netherlands ........................ 198/391

*Primary Examiner*—Jeffrey V. Nase
*Assistant Examiner*—Jonathan D. Holmes

*Attorney, Agent, or Firm*—Cyril M. Hajewski; James O. Skarsten

[57] ABSTRACT

Apparatus is provided for automatically loading a cylindrical workpiece into a machining system so that the workpiece is presented to the system in a prespecified orientation, the cylindrical surface of the workpiece containing a number of perforations, indentations or like apertures. The apparatus includes a feeding system for placing the workpiece in an initial position upon an upwardly inclined guideway, and further includes a pin, mounted in an advancement system, for alternatively contacting the cylindrical surface of the workpiece and engaging one of the apertures to urge the workpiece up through the guideway. The pin applies a frist frictional force to the workpiece when it is in contact with the cylindrical surface of the workpiece, and structure included in the guideway applies a second frictional force to the workpiece which interacts with the first frictional force to rotate the workpiece until the pin engages one of the apertures. A retaining system is provided for maintaining the workpiece in a position to which it is oriented by the engagement of the pin in one of the apertures, until the workpiece is presented to the machining system.

13 Claims, 6 Drawing Figures

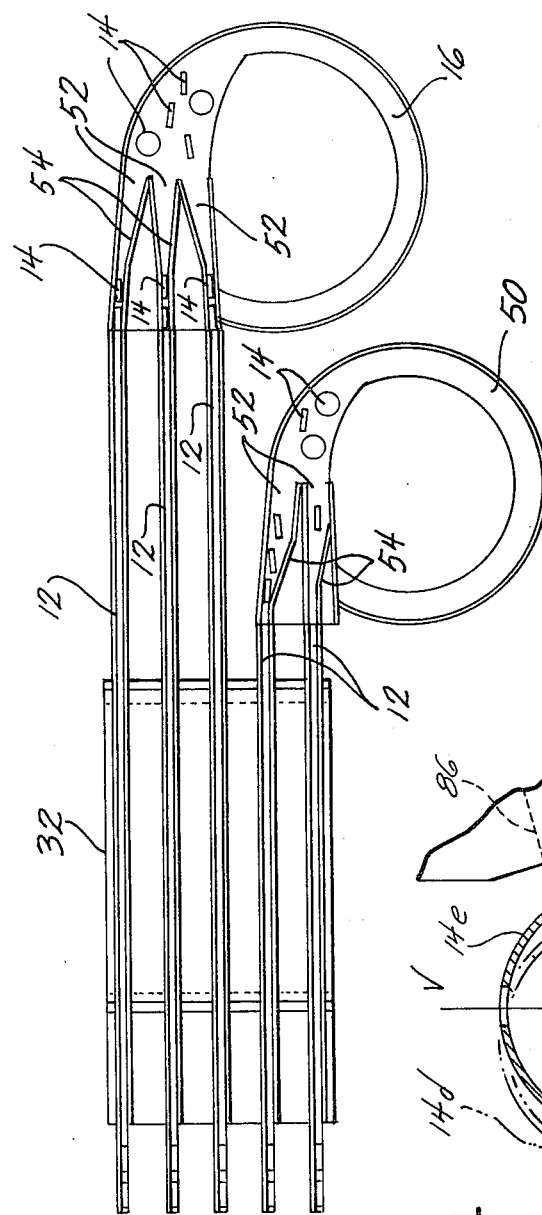
FIG. 2
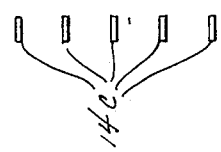
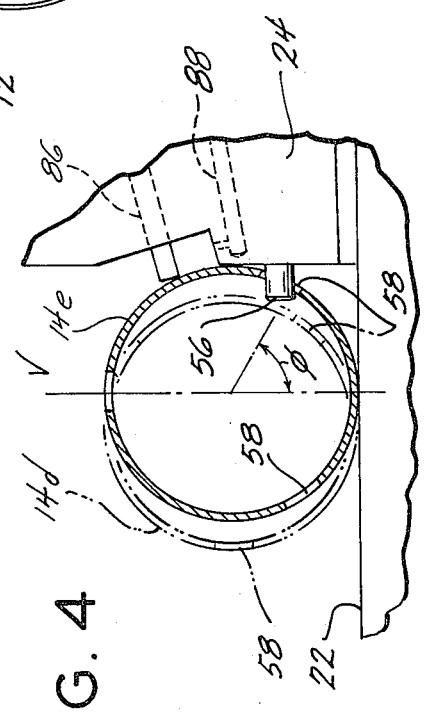
FIG. 4

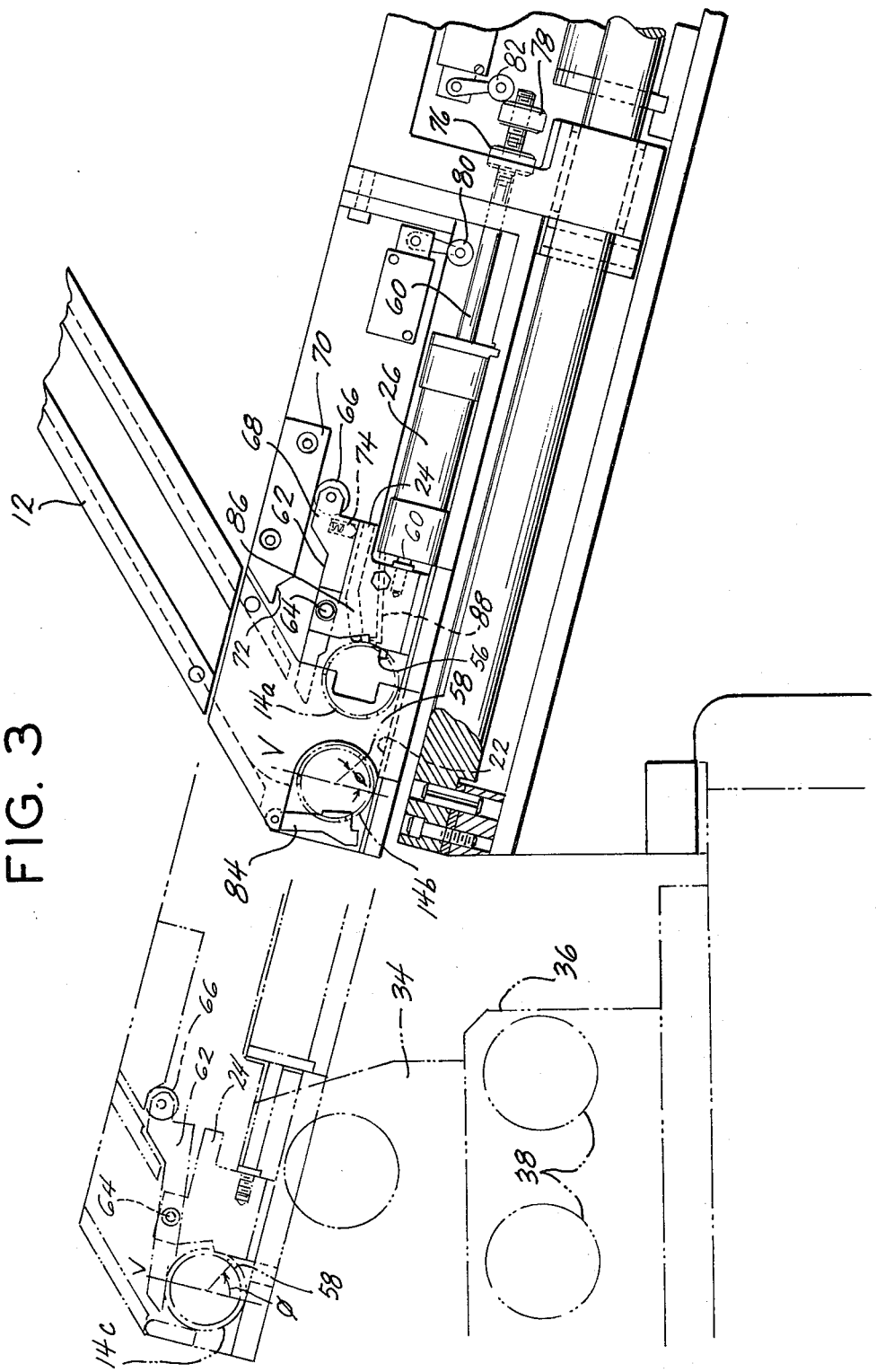

APPARATUS FOR AUTOMATICALLY LOADING AND ORIENTING A CYLINDRICAL WORKPIECE

BACKGROUND OF THE INVENTION

The invention disclosed and claimed herein generally pertains to automatic loading apparatus of the type which is capable of presenting cylindrical workpieces to a machining system in a particular, prespecified orientation, which may be critical for proper system operation. More particularly, the invention pertains to apparatus of the above type wherein workpieces may be initially received into the apparatus in orientations or positionings which are arbitrary. Even more particularly, the invention pertains to apparatus of the above type, wherein it is not necessary to notch, inscribe or otherwise vary the structure of a workpiece from the structure which it must have to perform its final intended purpose.

In order to join cylindrical workpieces such as camshaft bushings, or bushes, to certain types of engine blocks, a number of bushes are placed on respective arms or bars of an "H"-press, one bar corresponding to each of a number of bush positions on a block. After each bush has been placed upon a press bar, the press is manipulated so that each bush is first aligned with, and then pressed into, a bush position. Each bush is thereby brought into tight, immovable relationship with the engine block. In such operation, it is essential to maintain each bush in a particular, critical orientation with respect to the block, to insure that after the bush has been pressed onto the block, oil holes provided in the block will be in alignment with corresponding slots provided in the bush. If the oil holes and slots are not aligned, a camshaft mounted in the bush may not be properly lubricated, or may not be lubricated at all.

In the past, in order to insure that the above critical orientation of camshaft bushes was realized, the bushes would be placed upon respective press bars manually, one bush at a time, in a particular orientation with respect to the press bars. As far as is known, no device was available which could automatically load a bush onto a press bar so that the bush and the press bar would have a prespecified or pre-planned orientation in relation to one another. While an "H"-press could attach a number of camshaft bushes to an engine block in one movement or cycle, the efficiency of the press was limited, since a considerable amount of time and operator effort could be required, before the movement or cycle, to properly load the bushes onto the press.

SUMMARY OF THE INVENTION

The present invention provides apparatus for automatically loading cylindrical workpieces into a machining system, wherein the workpieces are presented to the machining system in a prespecified orientation which is necessary to achieve a desired interaction between the workpieces and the machining system. It is anticipated that such apparatus may be very usefully employed to significantly reduce the time, effort, and skill required to load camshaft bushes onto an "H"-press, in a prescribed orientation, whereby the efficiency of press operation may be substantially improved. Reference to such application, however, is by no means intended to limit either the scope or the utility of the present invention.

In the apparatus of the invention, feeder means are provided for placing a workpiece having a cylindrical outer surface in an initial position upon an upwardly inclined guideway, the cylindrical surface of the workpiece containing a number of holes, such as indentations or apertures. Usefully, such holes are present in a workpiece to enable the workpiece to perform its final intended purpose, whereby it is unnecessary to specially adapt the workpiece for use with the apparatus of the invention. If the workpiece comprises a camshaft bush, for example, the holes would comprise the aforementioned slots, which penetrate the wall of the bush to enable lubricating oil to pass through the bush after the bush has been pressed onto an engine block.

The apparatus is further provided with pin means, which alternatively contacts the cylindrical surface of the workpiece, and engages one of the holes in the cylindrical surface, to urge the workpiece up the guideway, the pin means applying a first frictional force to the workpiece when it is in contact with the cylindrical surface. Other means are provided for applying a second frictional force to the workpiece which interacts with the first frictional force to rotate the workpiece until the pin means engages one of the holes. A retaining means maintains the workpiece in a particular orientation, which is determined by the engagement of the pin means in one of the holes, until the workpiece has been presented to the machining system.

Preferably, the guideway includes a roughened inclined surface, and further includes two spaced apart walls, one wall being placed on each side of the inclined surface. The feeder means comprises means for receiving workpieces in arbitrary orientations, and for placing received workpieces at the lower end of the inclined surface. Preferably also, the pin means comprises means for urging the workpiece upwardly along the inclined surface between the walls, the cylindrical surface of the workpiece being maintained in contact with the inclined surface. The aforementioned second frictional force is generated by the contact between the cylindrical surface of the workpiece and the inclined surface of the guideway, and the walls of the guideway prevent lateral or sideward movement of the workpiece. The second frictional force exceeds the first frictional force by an amount which is great enough to insure that the workpiece will rotate until the pin means engages one of the holes in the cylindrical surface of the workpiece.

In a preferred embodiment of the invention, the workpiece comprises one of a number of parts having cylindrical wall, each of the parts being provided with a number of apertures which are selectively spaced around the circumference of its wall. The feeder means comprises means for receiving a number of parts in arbitrary orientations and positionings, for selectively aligning received parts, and for periodically enabling one of the aligned parts to be placed in the initial position. The pin means includes a pin which is sized to be receivable into each of the apertures of a part, and which is positioned, in relation to a part in the guideway, so that the pin is brought into alignment with one of the apertures of such part after the part has been rotated by the above frictional forces.

OBJECT OF THE INVENTION

An object of the present invention is to provide new and improved apparatus which is capable of receiving cylindrical workpieces in arbitrary orientations or positionings, and of presenting each received workpiece to a machining system in a prespecified orientation.

Another object is to provide apparatus of the above type, wherein it is not necessary to adapt or alter respective workpieces in any way in order to employ the apparatus to selectively orient and present the workpieces.

Another object is to provide a new and improved system for automatically loading camshaft bushes or bearings onto a press.

Another object is to substantially reduce the time and manual effort required to load camshaft bushes onto a press, while insuring that respective bushes will have a particular critical orientation, in relation to an engine block, after they have been attached to the engine block by the press.

These and other important objects and features of the invention will become more readily apparant by considering the following Detailed Description of the Preferred Embodiment, together with its accompanying drawings.

BRIEF DESCRIPTION OF THE DRAWINGS

FIG. 2 is a plan view showing a system which is constructed from a number of the embodiments of FIG. 1.

FIGS. 3 and 4 are sectional views for illustrating the interaction between the embodiment of FIG. 1 and a cylindrical workpiece which has been received thereby.

DESCRIPTION OF THE PREFERRED EMBODIMENT

Figure 1:
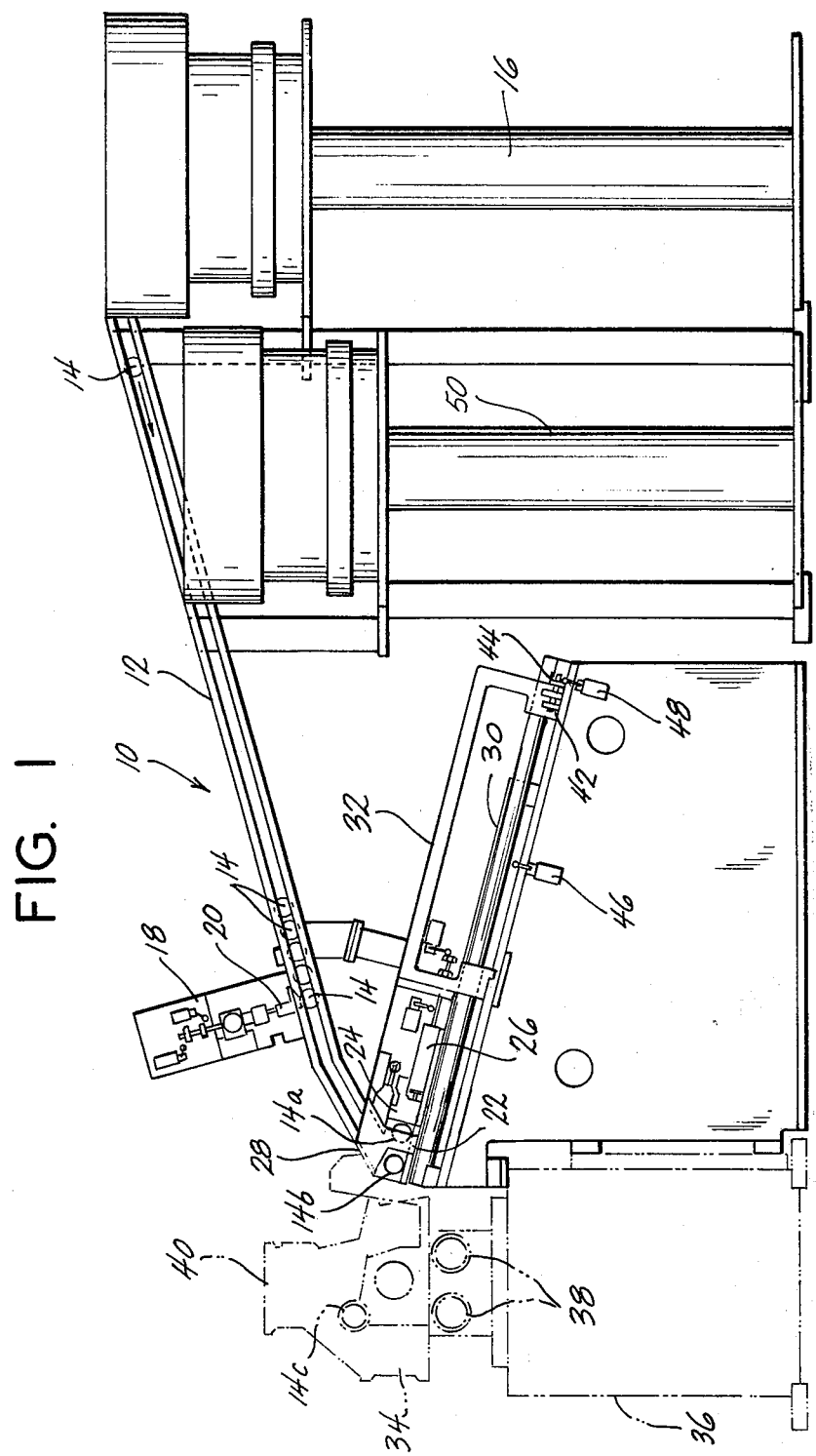
FIG. 1 is an elevational view, a section being broken away therefrom, which shows an embodiment of the invention in its operational environment.

Referring to FIG. 1, there is shown a loading unit 10 provided with an inclined track 12, which receives cylindrical camshaft bushes or bearings 14 from a vibratory bowl feeder 16. Respective bushes 14 entering track 12 have their axes in horizontal planes and slide down track 12 to an escapement unit 18, where they are retained by an escapement finger 20. At prespecified intervals, escapement unit 18 pivots finger 20 to allow the downwardmost bush on track 12 to continue downwardly, until the bush comes to rest in a pre-orientation position. In FIG. 1, the reference number 14a is employed to represent a bush 14 which is in the pre-orientation position. The cylindrical outer surface of bush 14a is in contact with a roughened inclined surface 22, at the lower end thereof, and also abuts a bush advancement device 24.

After a bush 14 has traveled down track 12 to the pre-orientation position, loading unit 10 commences a bush orientation and load cycle. Such cycle is commenced by operating hydraulic cylinder 26 to drive advancement device 24 so that the advancement device moves bush 14a upwardly along inclined surface 22, and through a guideway 28. Guideway 28 is provided to prevent lateral or sideward movement of a bush as it moves upwardly, and may comprise two closely spaced parallel walls, one placed on each side of surface 22 so that a bush moves upwardly between the walls.

Each camshaft bush 14 has a cylindrical wall which is penetrated by several slots, the slots being of equal dimensions, and being spaced around the wall of a bush in equidistant relationship. As aforementioned, when a bush 14 is pressed onto an engine block, it is essential that each of the slots of the bush be in alignment with a corresponding oil hole provided in the block. Consequently, as advancement device 24 moves a bush upwardly along surface 22, structure included in the advancement device causes the bush to be rotated until the bush is so oriented, in a vertical plane, that the slots of the bush are in critical, prespecified angular positions, regardless of the angular positions of the slots when the bush is in the pre-orientation position. Such structure of advancement device 24 is described hereinafter in detail, and is capable of rotating a bush 14 to its critical orientation by the time the bush is advanced to a pre-load position, which is located at the upper end of inclined surface 22. In FIG. 1, a bush in the pre-load position is indicated by the reference number 14b.

After a bush 14 is placed in the pre-load position by the upward movement of device 24, a hydraulic cylinder 30 is operated to move a carriage 32 forward, advancement device 24, inclined surface 22, and guideway 28 being mounted upon the carriage. When carriage 32 is extended fully forward, a bush at the upper end of incline 22 is placed in a press engagement position, a bush in such position being indicated in FIG. 1 by the reference number 14c. Advancement device 24 is provided with further structure, hereinafter described, which becomes operative after a bush has been rotated to its critical orientation to prevent further rotation of the bush. Consequently, a bush 14 retains its critical orientation after it is placed in the press engagement position, and its orientation in relation to a press bar 34, of an "H"-press 36, will always be known. Press bar 34 is constrained by guide bars 38 to forward and backward motion, along the axis of bush 14c, and is provided with structure for grasping bush 14c so that the critical orientation of bush 14c is maintained. Movement of press bar 34 is co-ordinated with the operation of load unit 10 so that after carriage 32 has been extended fully forward, to place a bush in the press engagement position, press bar 34 is moved forward to grasp the bush. The grasping structure of bar 34 may comprise, for example, two spring plungers (not shown) which are mounted on press bar 34 so that each plunger will be received into one of the slots of a bush 14c, and will lockably engage the bush.

After press bar 34 has grasped bush 14c, carriage 32 and advancement device 24 are fully retracted, concluding a load and orientation cycle. Bar 34 is then moved backwardly, to allow an engine block 40 to be moved into a prespecified position in relation to press 36. The positioning of block 40 is such that if press bar 34 is moved forwardly once more, the bush grasped thereby will be pressed into a bush or bearing position on block 40, and each of the slots of the pressed bush will be in alignment with an oil hole in the block. After the bush has been pressed into the block, press bar 34 is moved backwardly a second time, and the block is removed.

Referring further to FIG. 1, there is shown carriage 32 provided with trip dogs 42 and 44. Trip dog 42 operates a forward limit switch 46, to indicate that carriage 32 has been extended fully forward, and trip dog 44 operates a backward limit switch 48, to indicate that carriage 32 has been fully retracted.

It is well known that an engine block generally requires more than one camshaft bush. It is further well known that all of the bushes required by a block may be applied thereto during a single operation or cycle of an "H"-press, by providing the "H"-press with a number of bars 34 which is equal to the number of bush positions on the block. All of the bars 34 are mounted on the press in parallel relationship, and move forwardly and backwardly in unison. In order to assure efficient utilization of a conventional "H"-press, the press bars thereof should be loaded with bushes 14 simultaneously. Simultaneous loading may be achieved by mounting a number of loading units 10 upon carriage 32, each loading unit having its own escapement unit 18, its own track 12 for receiving bushes from a vibratory bowl feeder, and its own advancement device 24, hydraulic cylinder 26 and guideway 28.

Referring to FIG. 2, there is shown a multiple bush loading system wherein five loading units 10 are mounted upon carriage 32, and bushes 14 are entered onto each of five tracks 12 from a vibratory bowl feeder 16 or 50. Both feeders 16 and 50 comprise commercially available devices, such as devices manufactured by the Valley Automation Company, and are capable of receiving bushes 14 in arbitrary orientations or positionings. For example, a press operator may randomly introduce bushes 14 into the bowl feeders by pouring them thereinto from a box or other container. The bowl feeders operate to move bushes 14 into alignment areas 52, which communicate with respective tracks 12 and which are provided with structure 54 for turning respective bushes onto their edges. Each bush 14 is thereby enabled to roll down a track 12 to an escapement unit 18 of one of the loading units 10 of the multiple loading system.

Loading units 10 are mounted upon carriage 32 in parallel relationship, and execute orientation and load cycles of the aforedescribed type in unison, whereby five bushings 14c are simultaneously presented to a press 36. By providing press 36 with five press bars 34, all of the presented bushes may be simultaneously grasped by the press, and may then be simultaneously pressed onto an engine block. It will be readily apparent that by judicious selection of the number and arrangement of loading units 10 mounted on carriage 32, virtually any number of camshaft bushes 14 may be simultaneously presented to a press 36, each bush being in the aforestated critical orientation.

Referring to FIGS. 3 and 4 together, there is shown advancement device 24 provided with a rigidly mounted pin 56. When a bush 14 is placed onto inclined surface 22, the pin will either be in contact with the cylindrical wall of the bush, or else will be in alignment with one of the slots 58 of the bush. Pin 56 is sized in relation to a slot so that if it is aligned therewith, a slight forward movement of advancement device 24 will cause the pin to enter the slot. In FIG. 4, reference number 14d indicates a bush having its wall in contact with pin 56, and reference number 14e indicates a bush having pin 56 inserted into one of its slots.

At the commencement of an orientation and load cycle, hydraulic cylinder 26 drives a piston rod 60 to move advancement device 24 forwardly, as aforedescribed. If a bush in the pre-orientation position is oriented so that pin 56 is in alignment with a slot thereof, the pin will enter the slot and then urge the bush upwardly, along surface 22. If the pin is in contact with the wall of the bush, it will urge the bush upwardly along surface 22, and in addition will cause the bush to be rotated. Rotation occurs by roughening surface 22 sufficiently to insure that the frictional force generated by the contact between surface 22 and the cylindrical wall of the bush will be substantially greater than the frictional force generated by the contact between the cylindrical wall and pin 56, as the bush is urged upwardly.

It will be apparent that regardless of the initial orientation of a bush 14a, rotation of the bush will eventually cause pin 56 to become aligned with one of the slots 58, if the length of surface 22 is sufficiently long in relation to the rotational force upon the bush. Referring to FIG. 4, such alignment occurs when any one of the slots 58 is at an angle $\phi$, relative to a vertical axis V.

By judicious mounting of pin 56, a slot 58 will be at angle $\phi$ when a bush 14 is in its required critical orientation. Thereupon, pin 56 will enter the slot to prevent further rotation of the bush, and the bush will remain in its critical orientation as it is moved to the aforementioned pre-load position.

To further insure that a bush will retain its critical orientation, advancement device 24 is provided with a retention finger 62, which is pivotable about a point 64 and which is provided with a roller 66 at its rearward end 68. As advancement device 24 initially moves forward, roller 66 travels along a roller guide 70. After device 24 has moved a bush 14a a sufficient distance along surface 22 to insure that the bush has become critically oriented, roller 66 enters a groove 72 in guide 70, whereupon a spring 74 urges the forward end of retention finger 62 downwardly, to engage the bush. Further rotation of the bush is thereby prohibited, for the duration of the orientation and load cycle.

Referring further to FIG. 3, there are shown trip dogs 76 and 78 mounted upon the rearward end of piston 60. Trip dog 76 operates a forward limit switch 80, to indicate that advancement device 24 has been extended fully forward, and trip dog 78 operates a backward limit switch 82, to indicate that device 24 has been fully retracted. FIG. 3 also shows a latch 84, which is positioned to prevent a bush 14 from slipping out of loading unit 10 when the bush reaches the preload position.

Referring further to FIG. 4, there is shown the cylindrical wall of bush 14d spaced apart from a proximity switch 86, by pin 56, while the wall of bush 14e is shown to be in contact with the switch. Proximity switch 86 is activated when a bushing wall presses against it by reason of the entry of pin 56 into a slot and otherwise is deactivated. Consequently, activation of switch 86 provides notice that a bush 14 is critically oriented. FIG. 3 shows a blow-off tube 88, which is positioned to direct a stream of air upon switch 86 to prevent debris from collecting thereabound.

Figure 5:
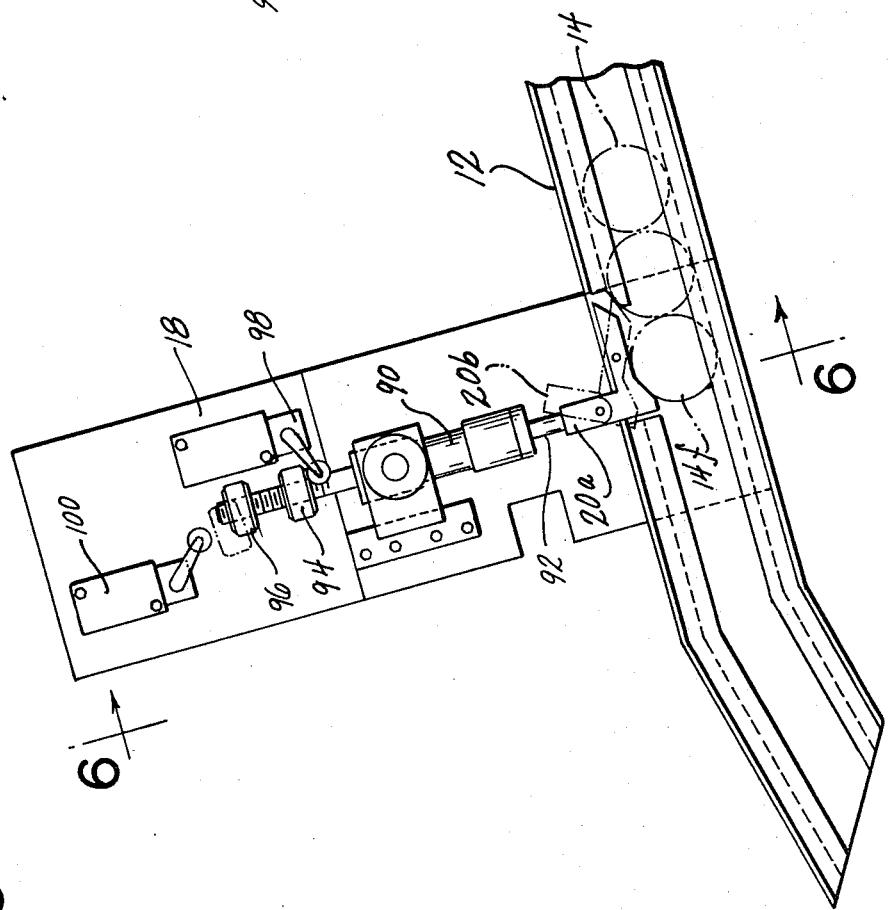
FIG. 5 is a view showing an escapement unit for the embodiment of FIG. 1.

Referring to FIG. 5, there is shown escapement finger 20 of escapement unit 18 in two operational positions, which are respectively indicated in FIG. 5 by reference numbers 20a and 20b. The escapement finger is in position 20a during an orientation and load cycle of unit 10, to prevent any bushings 14 from moving down track 12 during the cycle. At the conclusion of the cycle, an air cylinder 90 included an escapement unit 18 reciprocates a piston rod 92 in a first direction, causing the escapement finger to pivot from position 20a to 20b. Escapement finger 20 is structured so that as it moves from position 20a to position 20b, a single bush 14f is enabled to pass the escapement unit and proceed down track 12. Thereafter, cylinder 90 reciprocates cylinder rod 92 in the opposite direction, to return the escapement finger to position 20a. No bushes may pass the escapement unit during such movement.

Referring further to FIG. 5, there are shown trip dogs 94 and 96, attached to the rearward end of piston rod 92 to respectively operate forward limit switch 98 and backward limit switch 100.

Figure 6:
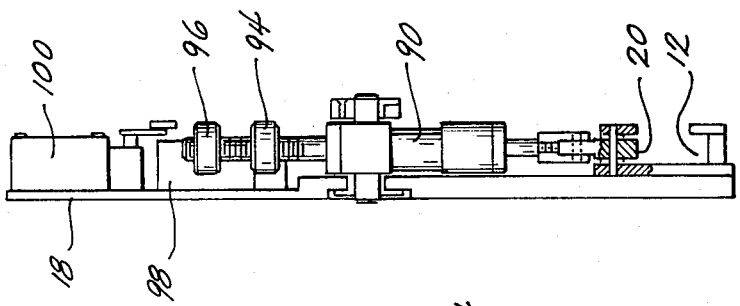
FIG. 6 is a sectional view taken along lines 6—6 of FIG. 5.

Referring to FIG. 6, there is shown a cross section of respective components of escapement unit 18. The mechanical linkage between reciprocating piston rod 92 and escapement finger 20 is of any conventional design which will insure that a reciprocation of cylinder rod 92 in one direction will pivot escapement finger 20 into position 20a, and so that a reciprocation of piston rod 92 in the opposite direction will pivot escapement finger 20 into position 20b.

It is anticipated that modifications of the above embodiment, as well as other embodiments of the invention, will occur to those of skill in the art. It is the intent of Applicants to include all of such modifications and embodiments which come within the scope of their invention, as hereinafter claimed, within the bounds of patent protection arising out of this application.

What is claimed is:

1. Apparatus for automatically orientating a part having a cylindrical outer surface which is provided with at least one opening of selected dimensions, said apparatus comprising:
   a feeding mechanism for moving said part onto a guide;
   a pin in position to be engageable with the opening in said part on said guide;
   means for moving said pin forwardly into engagement with the periphery of said part on said guide, and for advancing said part along said guide to a final position; and
   the forward movement of said pin operating to roll said part along said guide until one of said openings moves into alignment with said pin, to permit said pin to enter the opening and to prevent further rolling movement of the part, so that further forward movement of said pin causes a sliding movement of the part along the guide with the opening at a desired orientation, the part reaching said final position with the opening at the desired orientation.

2. The apparatus of claim 1 wherein said apparatus loads said part into a specified machining system with the opening at said desired orientation, and wherein:
   said pin alternatively contacts said cylindrical surface of said part and engages one of said openings when said part is moved on said guide, said pin applying a first frictional force to said part when said pin contacts said cylindrical surface;
   said guide includes means in contacting relationship with said part when said part is on said guide for applying a second frictional force to said part which interacts with said first frictional force to rotate said part until one of said openings moves into alignment with said pin to permit said pin to enter said opening; and
   said apparatus includes means for retaining said part in a critical angular orientation in relation to a vertical axis when said part is presented to said machining system.

3. The apparatus of claim 2 wherein:
   said means for applying said second frictional force comprises an inclined surface;
   said feeding mechanism comprises means for receiving said part in an arbitrary orientation, and for placing said received part at a lower end of said inclined surface; and
   said pin moving means causes said pin to urge said part upwardly along said inclined surface while said cylindrical surface of said part is maintained in contact with said inclined surface.

4. The apparatus of claim 3 wherein:
   said inclined surface is selectively roughened so that said second frictional force is generated by contact between said cylindrical surface and said roughened inclined surface when said pin urges said part upwardly, said second frictional force being greater than said first frictional force.

5. The apparatus of claim 4 wherein:
   said pin generates said first frictional force when said pin is in contact with said cylindrical surface.

6. The apparatus of claim 5 wherein:
   said guide includes means for preventing lateral movements of said part when said part is urged upwardly along said inclined surface; and
   said apparatus includes means for providing notice when said pin enters one of said openings.

7. The apparatus of claim 3 wherein:
   said pin moving means comprises means for moving said pin forwardly at the commencement of an orientation and load cycle; and
   said feeding mechanism comprises means for placing said part at the lower end of said inclined surface before the commencement of said orientation and load cycle.

8. The apparatus of claim 2 wherein:
   said retaining means comprises means for enabling said part to be rotated by the interaction of said first and said second frictional forces when said part is not in said critical orientation, and for prohibiting rotation of said part when said part is in said critical orientation.

9. Apparatus for loading a number of workpieces into a machining system, wherein each of said workpieces has a cylindrical outer surface which is provided with a number of holes of prespecified dimensions and configurations, and wherein said apparatus comprises:
   a selectively roughened inclined surface;
   feeder means for placing one of said workpieces in an initial position at the lower end of said inclined surface at the beginning of a loading cycle;
   advancement means for mounting a pin so that said pin is in alignment with one of the holes of said positioned workpiece when said positioned workpiece is in a prespecified angular orientation with respect to a vertical axis, and so that said pin is otherwise in contact with said cylindrical outer surface of said positioned workpiece; and
   means for driving said advancement means toward said positioned workpiece so that said pin urges said positioned workpiece upwardly along said inclined surface, said pin entering one of said holes if said positioned workpiece is in said prespecified orientation, and said pin otherwise causing said positioned workpiece to rotate until said positioned workpiece comes into said prespecified orientation.

10. The apparatus of claim 9 wherein said workpieces comprise camshaft bushes, each of said bushes being provided with a cylindrical wall which is penetrated by slots of selected dimensions, wherein said apparatus comprises means for presenting said camshaft bushes to a press in said prespecified orientation, and wherein said feeder means comprises:

means for receiving said camshaft bushes in orientations and positionings in relation to one another which are arbitrary;

means for positioning said received bushes so that each of said received bushes is selectively aligned in relation to each of the other received bushes, and so that the axis of each of said received bushes is in a horizontal plane; and escapement means for enabling one of said selectively aligned bushes to be placed in said initial position prior to the beginning of each loading cycle in a succession of loading cycles.

11. The apparatus of claim 10 wherein:

said receiving means and said alignment means comprise components of a vibratory bowl feeder, said vibratory bowl feeder comprising means for aligning received bushes along a downwardly inclined track; and said escapement means comprises an escapement unit having an escapement finger selectively positioned along said track, said escapement unit comprising means for pivoting said finger to allow one of said aligned bushes to roll downwardly along said track to said initial position prior to the beginning of each of said loading cycles.

12. The apparatus of claim 11 wherein:

said track, escapement unit, inclined surface, advancement means and driving means collectively comprise a bush loading unit mounted upon a carriage means; and said carriage means comprises means for moving said loading unit into a position which enables said press to grasp one of said bushes which is in said prespecified orientation before the conclusion of one of said loading cycles.

13. The apparatus of claim 12 wherein:

said loading unit comprises one of a plurality of loading units which are mounted upon said carriage means, said plurality of loading units comprising means for interacting with said carriage means to simultaneously present a number of bushes to respective press bars of an "H"-press, each of said presented bushes being in said prespecified orientation.

* * * * *